Figure 1:
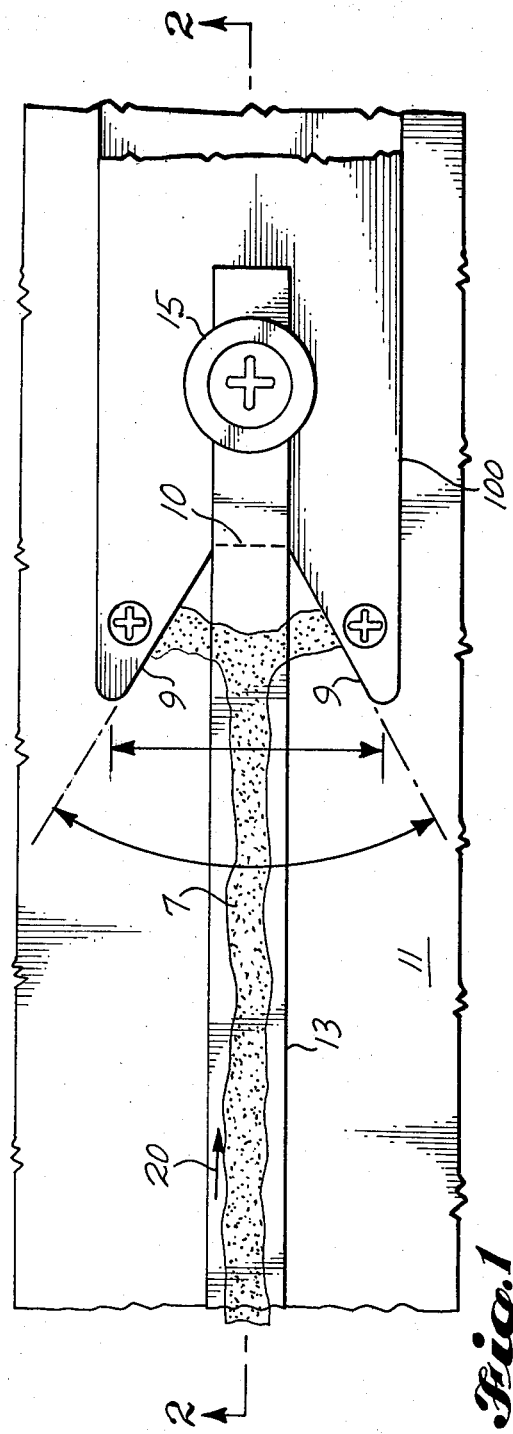

United States Patent [19]
King

[11] 4,380,039
[45] Apr. 12, 1983

[54] GROUNDING TERMINAL FOR LIGHTNING DIVERTER STRIP

[75] Inventor: Charles H. King, Kent, Wash.

[73] Assignee: The Boeing Company, Seattle, Wash.

[21] Appl. No.: 310,242

[22] PCT Filed: Sep. 28, 1981

[86] PCT No.: PCT/US81/01313
§ 371 Date: Sep. 28, 1981
§ 102(e) Date: Sep. 28, 1981

[51] Int. Cl.³ .............................................. H05F 3/00
[52] U.S. Cl. .................................................. 361/218
[58] Field of Search ................ 361/117, 212, 218, 220

[56] References Cited
U.S. PATENT DOCUMENTS

| | | | |
|---|---|---|---|
| Re. 25,417 | 7/1963 | Amason | 361/218 X |
| 3,755,713 | 8/1973 | Paszkowski | 361/218 |
| 3,989,984 | 11/1976 | Amason et al. | 361/117 X |
| 4,237,514 | 12/1980 | Cline | 361/218 X |

*Primary Examiner*—Harry E. Moose, Jr.
*Attorney, Agent, or Firm*—Conrad O. Gardner; Bernard A. Donahue

[57] ABSTRACT

A terminal for a high current lightning ionization channel is provided which has a truncated V-notch shaped end portion to which the lightning diverter strip is fastened by a bolt and dimpled washer arrangement. Electrical continuity of the diverter strip remains unbroken, thereby preventing the diverter strip from becoming a noise source during triboelectric charging conditions.

2 Claims, 2 Drawing Figures

U.S. Patent    Apr. 12, 1983    4,380,039

GROUNDING TERMINAL FOR LIGHTNING DIVERTER STRIP

The present invention relates to grounding terminals and more particularly to a grounding terminal for lightning diverter strips which lightning diverter strips are utilized for conducting lightning induced electrical currents and thereby protecting vulnerable aircraft components such as radomes and the like.

Heretofore washers similar to dimpled washers, as shown in FIGS. 8 and 10 of U.S. Pat. No. 3,989,984, have been utilized in conjunction with flat head bolts to provide conducting paths to ground for lightning currents. Lightning diverter strips, such as shown in U.S. Pat. No. 4,237,514, have been applied to an aircraft component such as a radome for lightning protection. Attachment of such composite diverter strips to ground for p-static charged drain have produced a high current concentration point during lightning strikes thereby causing severe erosion of the diverter strip in this region, the eroded area constituting a break in the electrical continuity of the diverter strip thereby causing the strip to become a noise source during triboelectric charging conditions.

It is therefore an object of the present invention to provide a grounding terminal for lightning diverter strips which allows for a transition of the ionization channel to metal surface areas of an aircraft without contacting the diverter strip.

It is a further object of the present invention to provide means coupled to a diverter strip for preventing excessive erosion of metallic particles in the dielectric strip due to discharge currents at the ground point.

It is still another object of the present invention to provide grounding terminal means for a lightning diverter strip which prevents the diverter strips from becoming a p-static noise source.

In accordance with a preferred embodiment of the present invention, a grounding terminal having a truncated V-shaped notch at one end portion is provided for transition of the ionization channel to metal without contacting the diverter strip thereby preventing excess of erosion of metal particles in the strip due to discharge currents at the ground point.

Figure 2:
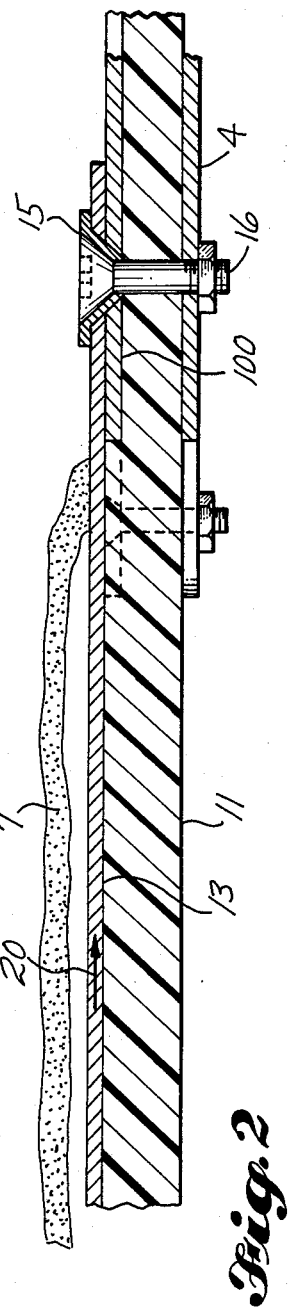

A full understanding of the present invention, and of its further objects and advantages and the several unique aspects thereof, will be had from the following description when taken in conjunction with the accompanying drawings in which:

FIG. 1 is a plan view of a grounding terminal for a lightning diverter strip utilized on a radome of an aircraft in accordance with a preferred embodiment of the present invention; and, FIG. 2 is a cross-sectional view taken along the lines 2—2 showing in more detail the p-static grounding feature accomplished through utilization of a dimpled washer.

Turning now to FIG. 1, it will be seen how the lightning current requirement can be met by grounding terminal 100 through provision of a terminus for the lightning ionization channel before it reaches the area where diverter strip 13 covers the dielectric to metal transition point 10 of randome surface 11 of an aircraft. The p-static grounding requirement is accomplished through utilization of a dimpled washer 15 also seen in sectional view in FIG. 2. Diverter strip 13 comprises a substrate of flexible dielectric tape having a lower surface adapted to be applied to the aircraft radome surface 11, the tape having an upper surface which includes a flexible epoxy binder carrying a conductive metal powder of finely divided aluminum uniformly deposited along the tape as shown in U.S. Pat. No. 4,237,514. FIG. 1 and also FIG. 2 further show how grounding terminal 100 is utilized on a radome portion 11 of an aircraft during a lightning strike condition. As seen clearly in FIG. 1, during a lightning strike the ionization channel represented at 7 is seen diverted to truncated V-notch shaped surface 9 forming an end portion of grounding terminal 100 prior to reaching the under surface dielectric-to-conductor transition point 10. As seen in FIG. 1, and more particularly in FIG. 2, the p-static charge current 20 is conducted along the surface of diverter strip 13 and grounded to metallic structure 4 underlying radome portion 11 through dimpled washer 15, and flat head bolt and nut assembly 16.

During simulated lightning tests of diverter strips, it was noted that erosion of the aluminum particles in the strip was especially pronounced where the strip crossed the dielectric-to-ground interface. This would compound the problem of noise generation since it was suspected that sparking would be most likely to occur where the density of aluminum particles is lowest. The high erosion rate at this point is due to the way the high current ionization channel transfer to the metal ground point. The present grounding terminal 100, having a truncated V-shaped notch portion 9, allows for a transition of the ionization channel to metal without contacting the diverter strip 13. Simulated lighting tests have shown the aforementioned surface shape 9 to prevent the excess of erosion due to discharge currents at the ground point. Laboratory testing has verified the configuration of surface 9 to provide both ground p-static currents without producing radio noise, and ground lightning currents without severely eroding the diverter strip near the terminus.

I claim:

1. A system for conducting lightning induced electrical currents to a metallic grounding structure in an aircraft, said system comprising:
    a lightning diverter strip for conducting lightning induced electrical currents along an aircraft outer surface portion;
    a grounding terminal having an end portion including a truncated V-notch shaped end surface;
    said lightning diverter strip coupled across said aircraft outer surface portion and through the center region of said truncated V-notch shaped end surface to said metallic grounding structure.

2. A grounding terminal for terminating a lightning ionization channel while providing p-static grounding, said grounding terminal comprising:
    an elongated electrical conductor having a generally rectangularly shaped cross section, and a first end portion for providing a terminus for said lightning ionization channel, said end portion having a truncated V-shaped notch, said end portion including a pair of apertures for providing electrically conductive connections to a conductive member in a supporting structure for said grounding terminal; and,
    a bolt and dimpled washer assembly disposed along the length of said electrical conductor outside said end portion having a truncated V-shaped notch for providing a terminus for p-static ground currents.

* * * * *